United States Patent [19]
Feinman

[11] Patent Number: 6,075,943
[45] Date of Patent: Jun. 13, 2000

[54] SYSTEM AND METHOD FOR CLIENT SERVER SOFTWARE INSTALLATION

[75] Inventor: Mark S. Feinman, Suffern, N.Y.

[73] Assignee: International Business Machines Corporation, Armonk, N.Y.

[21] Appl. No.: 08/910,380

[22] Filed: Aug. 13, 1997

[51] Int. Cl.[7] .................................................. G06F 7/02
[52] U.S. Cl. ............................................................ 395/712
[58] Field of Search ............................................ 395/712

[56] References Cited

U.S. PATENT DOCUMENTS

| | | | |
|---|---|---|---|
| 4,658,093 | 4/1987 | Hellman | 380/25 |
| 4,974,149 | 11/1990 | Valenti | 395/200.47 |
| 5,155,847 | 10/1992 | Kirouac et al. | 395/712 |
| 5,367,686 | 11/1994 | Fisher et al. | 395/712 |
| 5,509,074 | 4/1996 | Choudhury et al. | 380/23 |
| 5,742,829 | 4/1998 | Davis et al. | 395/712 |
| 5,809,287 | 9/1998 | Stupek | 395/712 |
| 5,812,668 | 9/1998 | Weber | 380/24 |
| 5,862,325 | 1/1999 | Reed et al. | 395/200.31 |

OTHER PUBLICATIONS

Kirovski et al., Procedure Based Program Compression, 1997, p.204–213.

Manber, A Text Compression Scheme that Allows Fast Searching Directly in the Compressed File, 1997, p.124–136.

*Primary Examiner*—Tariq R. Hafiz
*Assistant Examiner*—John Q. Chavis
*Attorney, Agent, or Firm*—Ratner & Prestia; Jay H. Anderson

[57] ABSTRACT

A system and method for remotely transferring and installing client server application programs from a source computer onto a remote client within a data processing system. Multiple installations are provided for to the same or different remote clients. Multiple application programs can be transferred and installed on a given delivery cycle.

17 Claims, 8 Drawing Sheets

| Field Name | Description |
| --- | --- |
| DATE TO INSTALL 110 | The date on which an application is to be installed. The format of this field is yyyy-mm-dd where yyyy is a 4-digit year, mm is a 2-digit representation of the month and dd is a 2-digit representation of the day of the month. |
| TIME TO INSTALL 112 | The time on the specified day that the application is to be installed. The format of this field is in military time; midnight is represented by 00:00. |
| INSTALL/SKIP 114 | Identifies if this application is to be installed this run or skipped over, regardless of what the date/time to install says. This field is useful because a list of all possible delivery points can be maintained in this file and deliveries to individual delivery points can be turned on or off simply by editing this field. The field takes on two values: "Yes" indicates that the application is to be delivered and "No" means do not deliver the application even if the date/time value says you can. |
| APPLICATION 116 | A string value that represents the application that is to be delivered. Each unique string value is then tied to a compressed file that represents the desired application. Further, this value also defines if the delivery is simple or complex. A simple delivery is simply the transfer of a packed file to the delivery point with nothing further performed after the delivery. An external means of installing the application is done (such as a web-based install or a specific program written to perform the installation once the file is delivered). A complex delivery means that after the file is transferred, the source computer sends remote commands to the delivery point to unpack the file and validate the installation. This would be done, for example, if an application was being delivered to a LAN local to the delivery point, and the application was being installed onto a network drive for others to access. Unpacking the compressed file on the network drive would result in a usable application by anyone with access to the LAN drive (and prerequisite software, if necessary). |
| DELIVERY POINT 118 | The name of the remote delivery point; that is, the remote computer onto which the compressed file will be transferred and the installation performed. In the preferred embodiment, this is a TCP/IP hostname or address. |
| TARGET INFORMATION 120 | The field labeled target information is actually a number of fields:<br>• Target drive: The local drive of the remote delivery point onto which the compressed file will be transferred.<br>•Target subdirectory: The subdirectory name of the remote delivery point onto which the compressed file will be transferred.<br>•Login id: The userid the installation process will use to log into the delivery point.<br>•Login password: The password to be used by the installation process to authenticate itself to the remote computer. The password can be encrypted or protected as required. |

FIG. 7

SYSTEM AND METHOD FOR CLIENT SERVER SOFTWARE INSTALLATION

FIELD OF THE INVENTION

The present invention relates to the field of installing application programs within a data processing system. More specifically, the present invention relates to automation of the distribution of application programs via a network.

BACKGROUND OF THE INVENTION

Today, application programs are used worldwide by sites within a data processing system. The application programs need to be deployed locally to the sites, due to an unacceptable impact on response time (when placed on one server). Therefore, each user can have a customized set of application programs that are remotely kept at the latest level.

Additionally, it is not practical for worldwide sites to access some of the application programs through a common server. A method was needed to deliver the application programs to a machine more local to these worldwide sites than a server at the central location.

The delivery process must be scheduled such that it can send the application program to the remote site at a specified time. Usually receipt is required on the target machine after midnight local time. It is not practical for someone to send the application to these sites manually, because many sites require late night delivery and also due to the sheer volume of user sites. Additionally, the transfer of application programs to sites in the Asia-Pacific region for example can take over an hour due to the size of the application, the local network bandwidth and the distance of the file transfer.

The delivery process should validate that the application delivery was successful, so that any corrective action could be taken in the event that there is a problem. This is especially important if the installation system is to run unattended.

The present alternative method of requiring each user to download the application program, puts the responsibility onto each user to update the application program and validate that the software was successfully installed. Additionally, installations can be complex, requiring the services of an installation expert. This method is time consuming, expensive and prone to error, because the method involves manual processes. There is a need for an improved method of installation, where the source machine remotely installs the application programs onto another machine and does not require manual interaction at each site.

SUMMARY OF THE INVENTION

The purpose of this invention is to provide a simple and effective means of remotely transferring and installing client server application programs or files from a source computer onto a remote client or user within a data processing system. An application program is compressed into one file and is transferred at a specified date and time to a designated remote machine's local drive and sub-directory in an unattended mode. The compressed file is then unpacked on the remote client (or left compressed as required) such that the result of the decompression yields a similar sub-directory structure to that of the remote client, overwriting all old files in the process. The result of the remote decompression is then validated against the source information to determine if the remote installation was successful. Multiple installations are provided for to the same or different remote clients. Multiple application programs can be transferred and installed on a given delivery cycle. Logs are maintained to assist in problem determination and resolution. The provision for immediate transfer and installation is also a feature of this invention.

BRIEF DESCRIPTION OF THE DRAWINGS

The invention is best understood from the following detailed description when read in connection with the accompanying drawings. Included in the drawings are the following figures:

FIG. 7 is a table illustrating the contents of the sequential file used for the remote installation of the application programs.

DETAILED DESCRIPTION OF THE PREFERRED EMBODIMENT

Overview

Figure 1A:
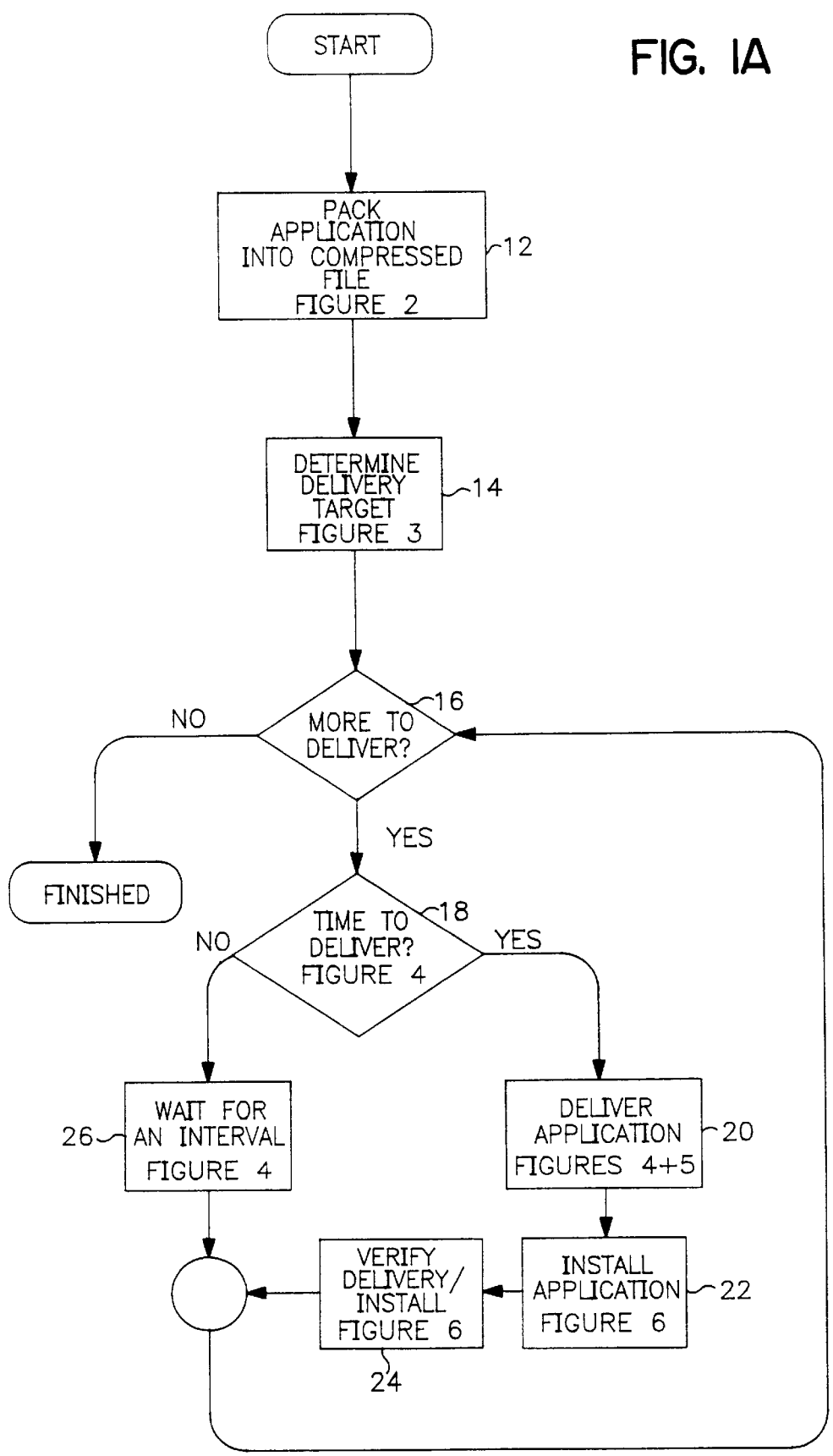
FIG. 1a is a flow chart illustrating a high level chart of the invention.

FIG. 1a shows an overview of the automated installation system for installing application programs to remote clients or user via a network. The automated installation system, in step 12, packages up one or more applications into a compressed file. The packing process packages up the identified application into a compressed file which records all subdirectories the application program uses, so that the decompression of the application program recreates the exact directory structure. The system in step 14 determines the delivery points and when specific application program(s) need to be delivered to these delivery points. The delivery information is stored in a sequential file, illustrated in FIG. 7.

The automatic installation system runs on the source computer in an unattended mode. If, by reading the sequential file, the automatic installation system determines that no application programs need to be delivered at the current time, then the automatic installation system, in step 26, waits for a specific time interval. The automatic installation system checks the date and time in the sequential file records to determine if its time to deliver the application programs to the remote clients.

The application programs are delivered to the desired remote clients in step 20 at the designated times (or immediately, if required). The application programs are installed by the automatic installation system in step 22 to the remote client's delivery point. The automatic installation system, in step 24, verifies, through several checks, that each application program was installed successfully. The automatic installation system maintains three logs; a summary log, an error log and a full log. If no further application programs require installation, the automatic installation system, in step 16, summarizes itself and has completed all processing.

Figure 1B:
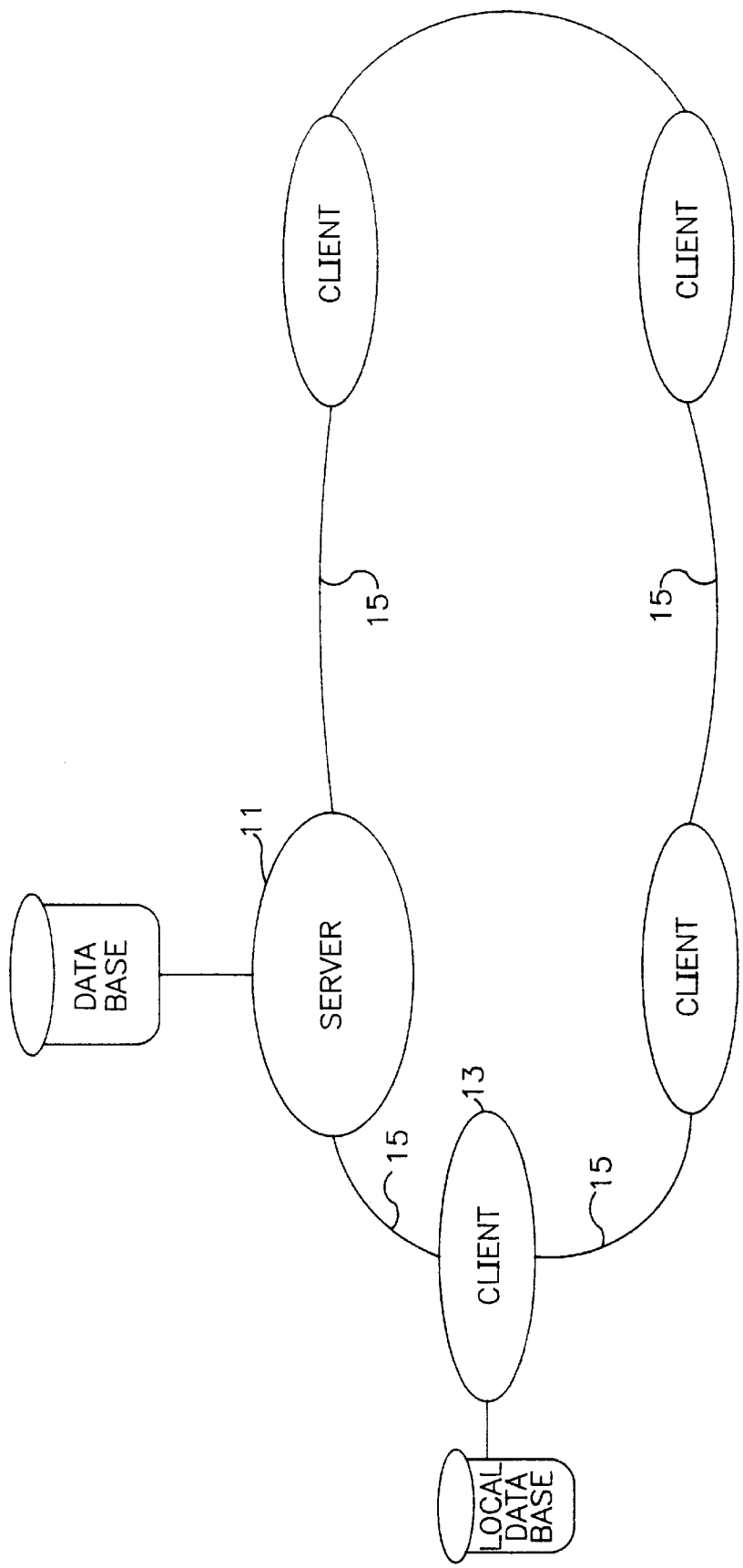
FIG. 1b is an example of a data processing system.

An example of a data processing system which can use the automatic installation system to install application programs to remote clients via the network is shown in FIG 1b. In FIG. 1b, the server 11 shown has application programs which require automatic delivery to the remote clients 13. The installation will occur over the LAN 15, and in some cases over the WAN to world-wide sites. The automatic installation system will run automatically and install the application programs only to the sites that require the application programs.

Detailed Description

Figure 2:
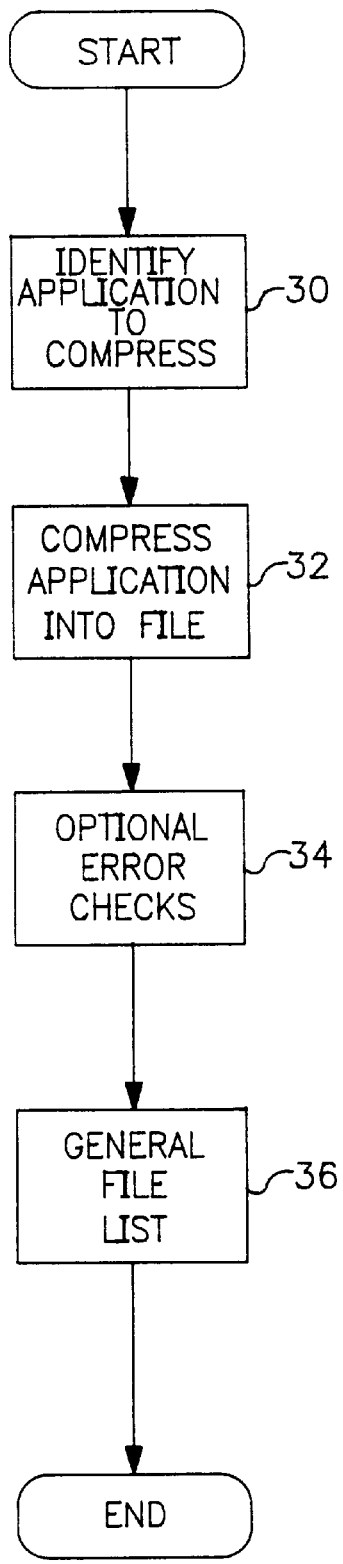
FIG. 2 is a portion of a flow chart illustrating the packaging operation of the portion illustrated in FIG. 1A.

Referring to FIG. 2, there is shown the details of step 12 in FIG. 1A. As illustrated in FIG. 2, an application is first packed into a compressed file. The purpose of compressing the file is to minimize the number of bytes that need to be transferred over a network from the source machine onto the remote client. The smaller the file, the faster the file transfer. The application program to be packed up needs to be identified such that the packing process in step 30 knows which application program is to be compressed. If an application program consists of multiple subdirectories, all subdirectories the application program uses are remembered in the compressed file, because if a user installs the application program, the decompression process needs to recreate the exact directory structure. Once identified, the application program is packed in step 32. The packing method define in step 32 can be any of the compression programs that are available on the market today such as PKZIP. The only restriction is that the decompression program to be used must be able to interpret the compressed file and know how to decompress it. Therefore, if PKZIP is used to compress the application, the sister program PKUNZIP would need to be used to decompress the application. The compression process can also perform basic error checking if desired, as defined in step 34, such as ensuring that filenames are all shorter than 12 characters if the target of the application is a personal computer that uses DOS naming conventions. After the error checks occur and the application program is successfully compressed, a list of all the files in the application program is generated as shown in step 36. The list will be used later on by the automatic installation system to ensure that all files for an installation were transferred and unpacked successfully.

Figure 3:
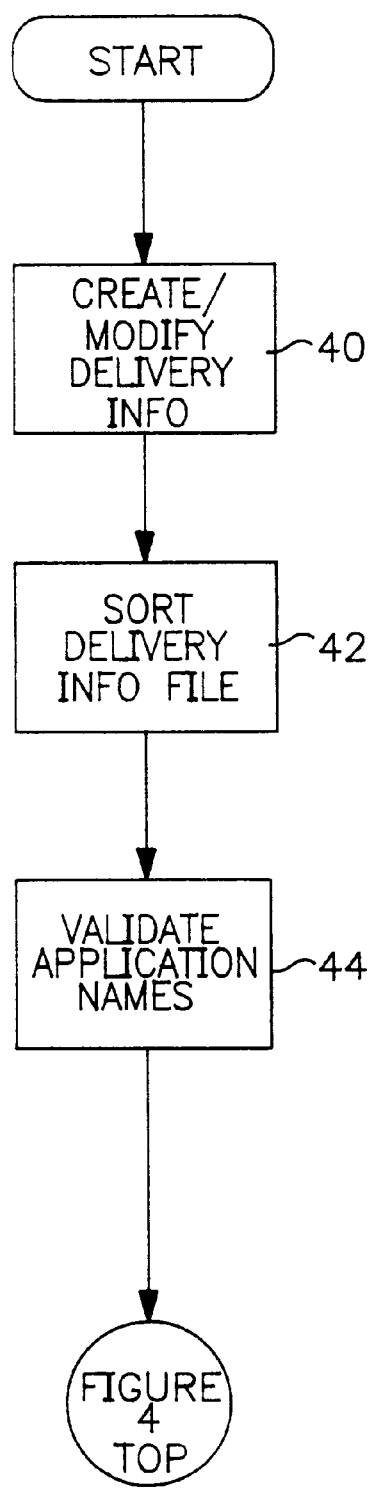
FIG. 3 is a portion of a flow chart illustrating the creating of delivery information operation of the portion illustrated in FIG. 1.

Once the application program(s) have been packed up, the next step is to identify the remote client's delivery points, the application programs that are to be delivered to each delivery point and the time that each application program is to be delivered (FIG. 3). This information is stored in sequential file 100, illustrated in FIG. 7, that is structured in the following manner:

Date-to-install Time-to-Install Install/Skip Application Delivery-Point Target-Information 110 112 114 116 118 120

Each field in the sequential file is separated by one or more spaces and information for one remote client delivery point appears on one line in the file. For every application program that is to be delivered, there is a corresponding line in the file.

The sequential file 100, containing the information as described above is manually edited, as shown in step 40, by someone responsible for the remote installation of the applications, typically a support programmer. Once this file is saved, the automatic installation system is then started on the source computer. The source computer is typically a machine whose responsibility is mainly to deliver and install the packed files to remote destinations, it does not have to be a dedicated machine. From this point on, once the application programs are packed and the sequential file is edited to indicate to the automatic installation system that it has work to do, the automatic installation system can run unattended.

The next step of the automatic installation system, defined in step 42, is to sort the sequential file in ascending order by the date and time, hence building the order of application program delivery. The automatic installation system can then check the names of the application programs to be delivered against a known list of valid application programs, as shown in step 44, such that rogue application programs are not delivered erroneously.

Figure 4:
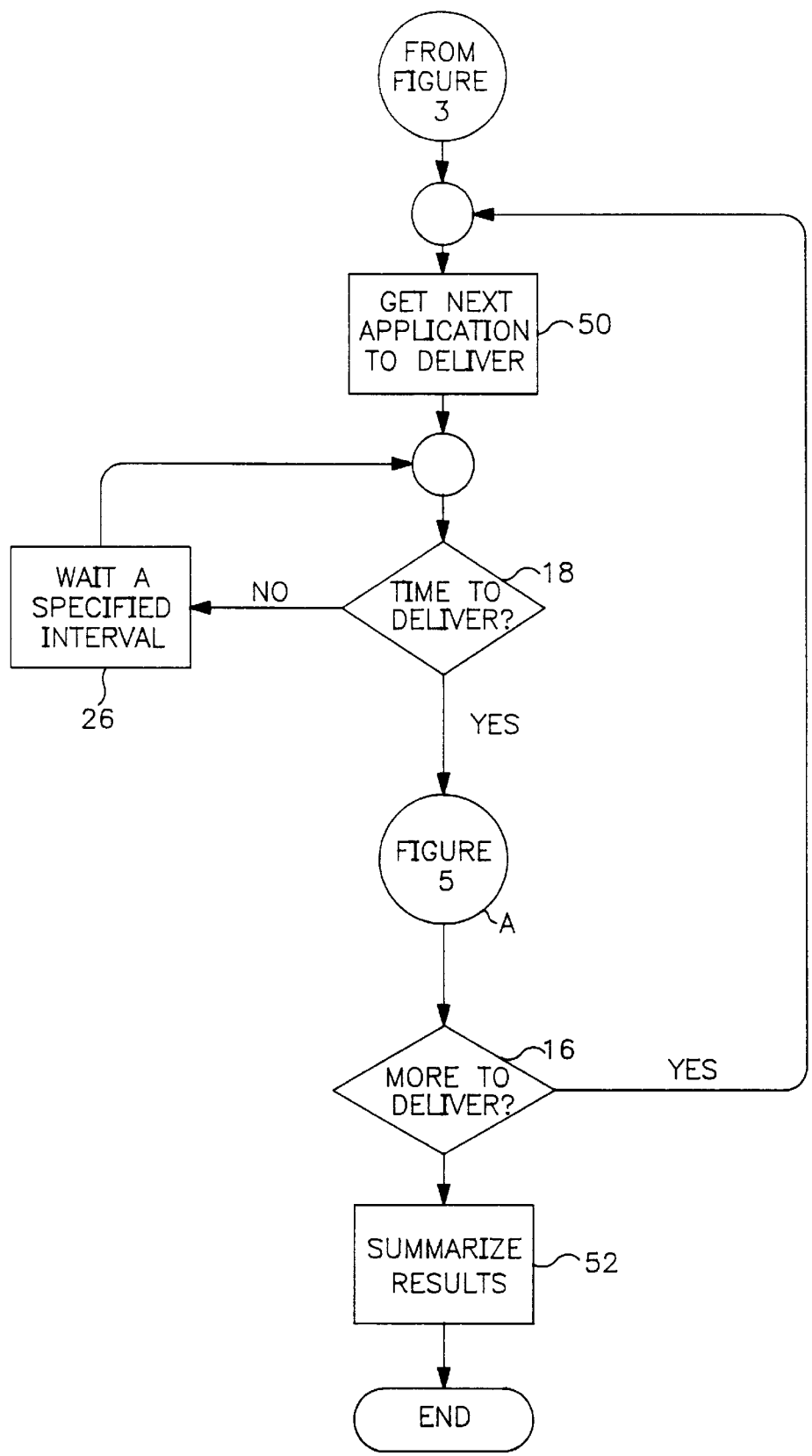
FIG. 4 is a portion of a flow chart illustrating the delivery operation of the portion illustrated in FIG. 1A.

Once the list of application programs to be delivered is validated, the delivery process runs until all application programs that are to be delivered in this run have been delivered (FIG. 4). The next application program to deliver is determined by reading the next record, as shown in step 50, in the sequential file 100. This record contains the application program that is to be delivered, where it is to be delivered and the date/time it is to be delivered. It also contains a value that indicates if the delivery is to occur now or be skipped. If the application program is to be skipped, the next record in the sequential file is read until an application program is found to deliver, or there are no more application programs to deliver.

Figure 5:
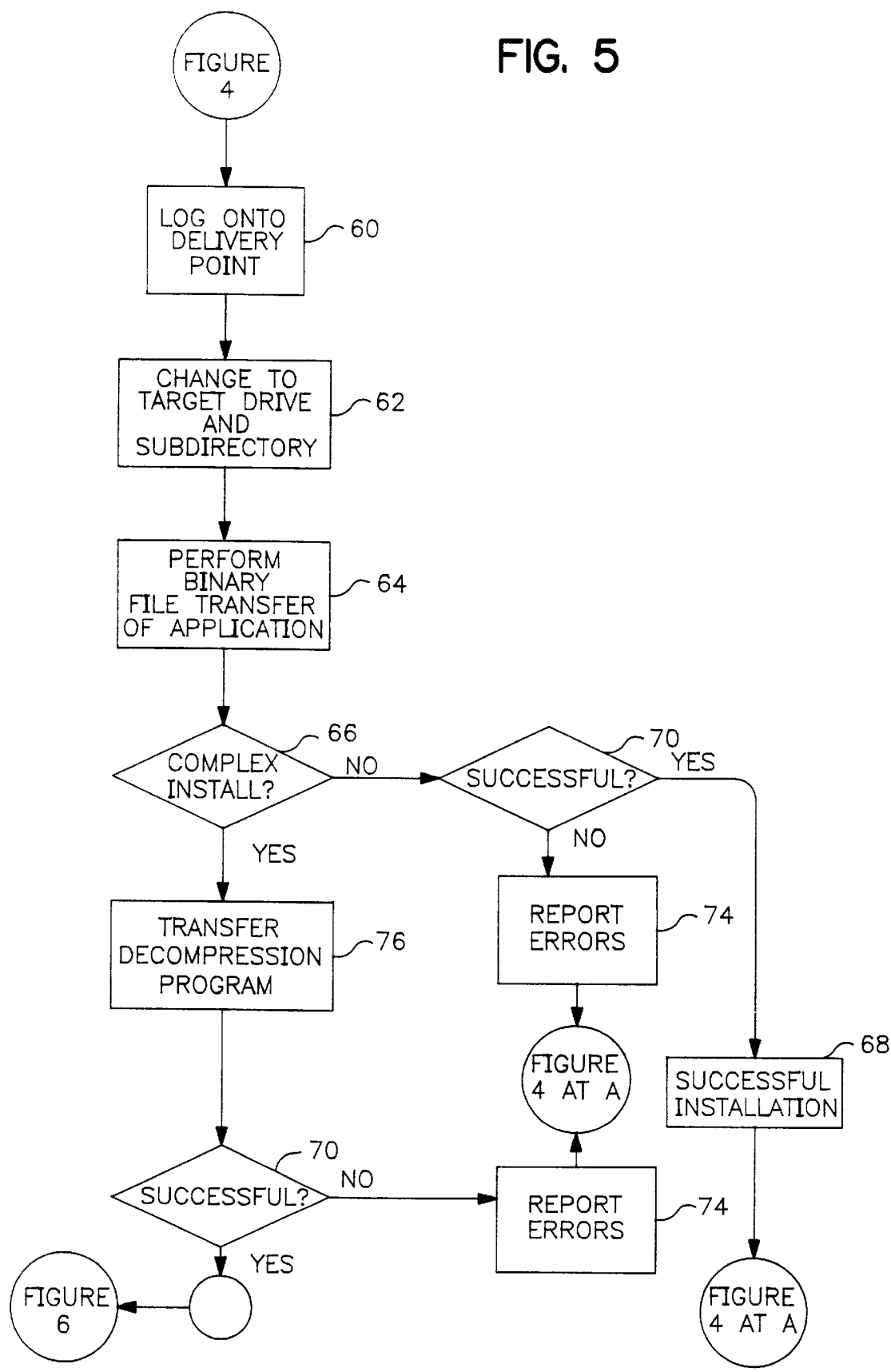
FIG. 5 is a portion of a flow chart illustrating the delivery sequence operation of the portion illustrated of FIG. 4.

Once an application program is found to deliver, the date and time in the record are compared, as shown in step 18, to the current date and time. If it is time to deliver the application program (the current date and time are past the application's delivery date and time), the automatic installation to the remote client's delivery point begins (FIG. 5). If it is not yet time to deliver the application program, the automatic installation system suspends itself for some interval as shown in step 26. In the preferred embodiment of the automatic installation system, the interval was five minutes. When the wait interval expires, the date and time in the record are again compared to the current date and time as shown in step 18. The process is repeated until it is time to deliver the application program.

Application programs can be delivered "immediately" simply by specifying a delivery date and time before the current date; that is, by specifying a passed date. This is done when the initial delivery of an application program has failed and needs to be repeated at a later date, or when application program fixes need to be distributed immediately.

Once this application program is delivered, the next record in the sequential file is read containing the next application program to be delivered as shown in step 16. The automatic installation system is again repeated. If there are no more application programs to be delivered, the automatic installation system summarizes its results as shown in step 52. The information contained in the summary includes, but is not limited to, the following:

(1) number of successful installations (2) number of failed installations (3) a report on why some installations may not have been successful (4) a log of everything the delivery process did (5) the clasped time of each installation, by delivery point.

This information can be tailored as necessary depending on the types of application programs that are delivered.

When it is time to deliver the application programs (FIG. 5), in the preferred embodiment, the application program to be transferred is then transferred to the specified remote client and placed on the specified drive and subdirectory using TCP/IP File Transfer Protocol (FTP). The automatic installation system logs onto the remote client in step 60 using the id and password obtained from the sequential file. Once logged on successfully, the target drive and the target subdirectory are identified and the automatic installation system then points to it in step 62. The compressed file is then transferred in binary mode as shown in step 64. If the installation is complex as defined in step 66, an additional file transfer occurs as shown in step 76. The program that is to be used to decompress the application program is sent to the delivery point such that the compressed file can be decompressed by the automatic installation system. The assumption is always that the remote client delivery point does not have the decompression program and the source computer needs to supply it. If the application program is considered simple, no further file transfers need to be done, the installation is successful.

If the file transfer fails in step 70, an error code is trapped and an error message is placed into two of three logs maintained by the automatic installation system as shown in step 74. These logs are generated in the form sssxxxxx.yyy, where "sss" is a three-character abbreviation of the automatic installation system (an arbitrary value), "xxxxx" is today's date in the form month-abbreviation/day (Mar08, for example) and "yyy" is a file extension of LOG, SUM or ERR. The three logs are:

(1) Summary: A summary of all sites where the installation occurred, and if the installation to this site was successful (or skipped if this was requested). A quick glance of this log would tell you everything you need to know regarding which sites received the application program and which ones did not. This log would simply say an error occurred and point to the error log for what the error actually was.

(2) Error: A list of any errors that occurred during the installation. Only error messages appear here.

(3) Full log: Everything that happened during the run of the automatic installation system. All messages echoed to the screen are repeated here, so if one needed to see exactly what happened on a given run, reading this log will contain this information.

Figure 6:
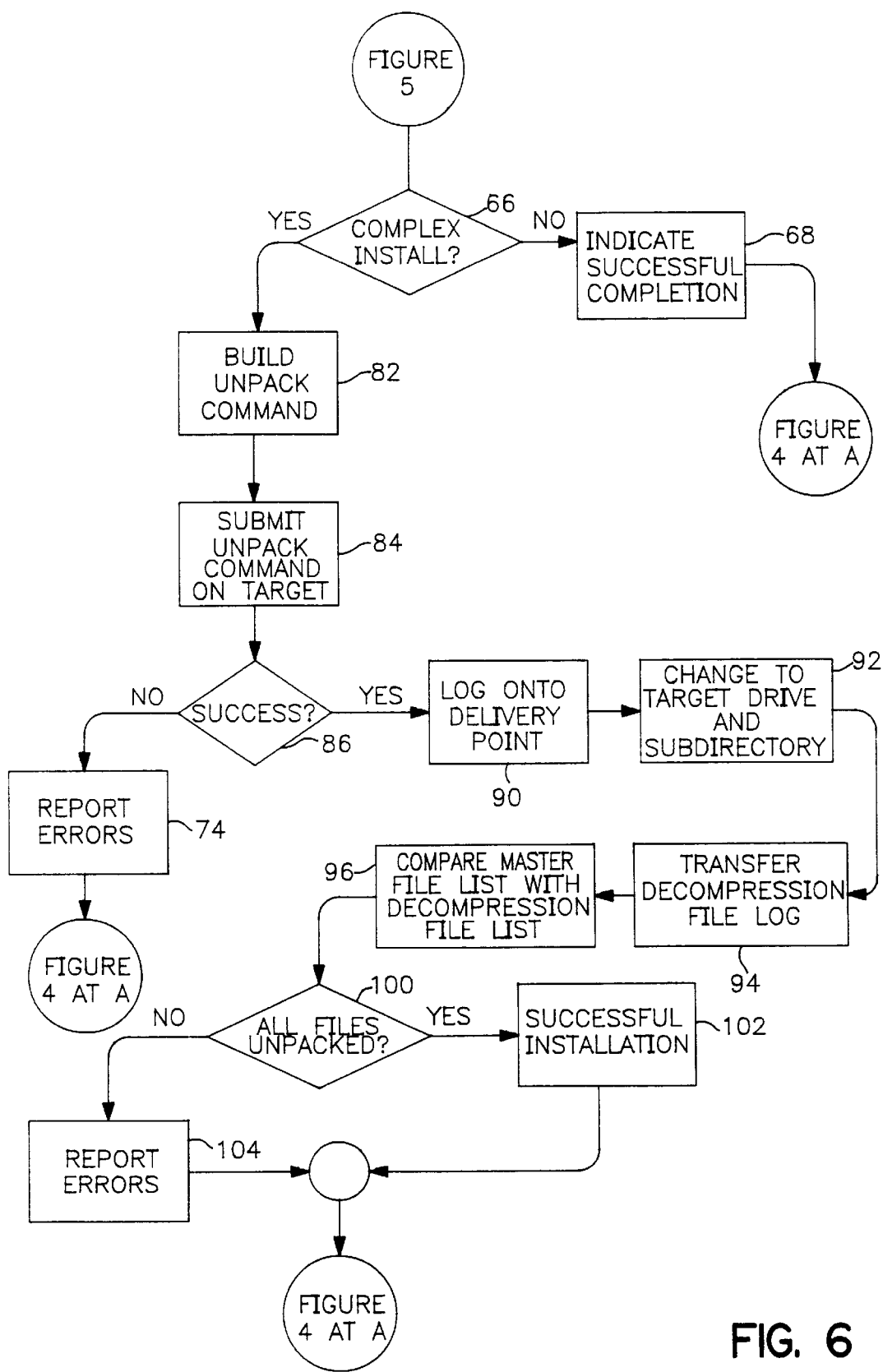
FIG. 6 is a portion of a flowchart illustrating the remote installation and validation operation of the portion illustrated in FIG. 5.

Referring to FIG. 6, if the application program being delivered is considered simple in step 66 (no unpacking is to be done now—an external program handles it), the installation is considered successful at this point as shown in step 68. If the application program being delivered needs to be unpacked now; that is, it is considered complex, the application program file must be unpacked and installation is validated (FIG. 6). The automatic installation system builds a command for remote submission in step 82 on the remote computer. The command contains the name of the decompression program that is to be run, and any argument the decompression program required, typically the name of the file to decompress and where the individual unpacked files are to be placed. The decompression command should also create a list of every file that was unpacked and optionally, a cyclic-redundancy check (CRC) value that could be used to ensure that the unpacked file on the remote client matches the one found on the source computer. The remote client's target of the unpacking is typically the same subdirectory as the one the compressed file was transferred to, but this is not required to be the same subdirectory. The command is then submitted on the remote client in step 84 and the automatic installation system waits for the remote client to complete the unpacking, or waits until a time limit is reached. If the time limit is reached and the decompression is not yet complete, an error is assumed (for example, a network connection dropped). If an error occurred in step 86, the error is recorded to the appropriate logs as explained previously in step 74. If the decompression command completes normally, the list of files needs to be validated.

The automatic installation system once again logs onto the remote machine in step 90 using the id and password obtained from the sequential file. Once logged on successfully, the target drive and the target subdirectory are identified and the automatic installation system then points to it as shown in step 92. The decompression file log is then transferred back from the remote client to the source computer as defined in step 94. The list of files actually unpacked on the remote client is then compared to the list of files that was generated when the compression took place as shown in step 96. The checks here can include, but are not limited to, the following:

(1) The number of files in the compressed file is the same as the number of files actually unpacked.

(2) All filenames, on a file by file basis, that exist in the master list must exist in the decompression log transferred from the remote client.

(3) All files transferred are checked to ensure that their CRC values match those of the source.

(4) All files transferred are checked to ensure that they were not in use at the time of transfer, to rule out the possibility of an incomplete or skipped file in the transfer.

If the checks on the decompressed files are successful, the remote installation is said to be successful as shown in step 102. If any of the above checks failed, the installation is said to be unsuccessful as defined in step 104, and the list of files actually transferred is appended to the error log for use in problem determination and resolution.

In one embodiment of the invention, the data base is a DB2 data base for a data warehouse of Marketing, Sales and Financial data. The DB2 data base runs on an IBM MVS mainframe which uses an IBM OS/2 LAN Server network. The application programs were written to access the information in the warehouse. The application programs were written in Visualizer or Visual Age C++. The audience using the application programs spans all sites across the world. The automatic installation system can deliver any or all of the following application programs:

1.) MS/2—a marketing and sales system designed to report on current and projected revenues 2.) Financial Reports—generates predefined financial reports on the data in the warehouse 3.) Forecast—used by Marketing and Sales to forecast future demand for products 4.) Manufacturing Reports—indicating how the manufacturing of certain components is doing 5.) Administration—application program permits users to control other's access.

In an embodiment of the invention, the automated installation system is a series of REXX (IBM Application Programming Language) execs that 1.) packs up the application programs into compressed files as shown in step 12

2.) processes the list of sites and the application programs to deliver to those sites as shown in step 14

3.) delivers the applications to the remote site at the designated time as shown in step 20

4.) sleeps until its time to deliver next application program as shown in step 26

5.) verifies successful delivery of each application program as shown in step 24.

While this invention has been described with reference to specific embodiments, it is not necessarily limited thereto. Accordingly, the appended claims should be construed to encompass not only those forms and embodiments of the invention specifically described above, but to such other forms and embodiments as may be devised by those skilled in the art without departing from its true spirit and scope.

What is claimed:

1. A method of installing an application program within a data processing system, to a remote user comprising the steps of:
   a) packaging the application program into an application package;
   b) creating delivery information in a sequential file;
   c) determining when an install is to occur based on the delivery information;
   d) logging onto the remote user; and
   e) automatically delivering and installing the respective application program without remote user interaction, the step of automatically delivering and installing includes the steps of:
   transferring a decompression program to the remote user;
   decompressing the application program;
   verifying the successful decompression of the application program; and
   updating system logs of the data processing system.

2. The method as recited in claim 1 wherein step (a) includes:
   compressing the application program into a single file;
   performing error checks; and
   generating a list of all the files in the application package.

3. The method as recited in claim 1 wherein step (b) includes:
   creating a record in a sequential file comprising date and time to install, skip flag, application name, remote user name, and remote user information.

4. A method as recited in claim 1 wherein step (b) includes validating the application program name against a list of valid application programs for delivery.

5. A method as recited in claim 1 wherein step (b) includes indicating delivery is to occur immediately.

6. A method as recited in claim 1 wherein step (c) includes:
   reading a record in the sequential file;
   checking if the application is to be skipped;
   comparing the date and time to install in the record of the sequential file with the current date and time; and
   suspending the delivering for a predetermined time period if no application program is to be delivered based on the delivery information.

7. A method as recited in claim 1 wherein steps (c) and (d) include:
   logging onto the remote user;
   installing the application program to a target drive and subdirectory of the remote user; and
   updating system logs of the data processing system.

8. A method of installing at least one of a plurality of application programs within a data processing system, to a remote user comprising the steps of:
   a) packaging the application programs into application packages;
   b) creating delivery information in a sequential file;
   c) determining when an install is to occur based on the delivery information;
   d) logging onto the remote user; and
   e) automatically delivering and installing each application program without remote user interaction, the step of automatically delivering and installing includes the steps of:
   transferring a decompression program to the remote user;
   decompressing the application program;
   verifying the successful decompression of the application program; and
   updating system logs of the data processing system.

9. A method of installing an application program within a data processing system, to at least one of a plurality of remote users, comprising the steps of:
   a) packaging the application program into an application package;
   b) creating delivery information in a sequential file, based on time and date of desired delivery to each remote user;
   c) determining when an install is to occur based on the delivery information;
   d) logging onto each remote user;
   e) delivering and installing the application program automatically to each remote user at the specified date and time without remote user interaction, the delivering and installing of the application program includes the steps of:
   transferring a decompression program to the remote user;
   decompressing the application program;
   verifying the successful decompression of the application program; and
   updating system logs of the data processing system; and
   f) verifying, at each remote user, the installation of the proper number of files within the application program were successfully installed.

10. A method of installing at least one of a plurality of application programs within a data processing system, to at least one of a plurality of remote users, comprising the steps of:
   a) packaging the application programs into application packages;
   b) creating delivery information in a sequential file, based on time and date of desired delivery to each remote user;
   c) determining when an install is to occur based on the delivery information;
   d) logging onto each remote user;
   e) delivering and installing each application program automatically to each remote user at the specified date and time without remote user interaction, the step of delivering and installing includes the steps of:
   transferring a decompression program to the remote user;
   decompressing the application program;
   verifying the successful decompression of the application program; and
   updating system logs of the data processing system; and
   f) verifying, at each remote user, the installation of the proper number of files within the application program were successfully installed.

11. A system for installing an application program within a data processing system, to a remote user comprising the steps of:
   a) means for packaging the application program into an application package;

b) means for creating delivery information in a sequential file;

c) means for determining when an install is to occur based on the delivery information;

d) means for logging onto the remote user; and e) means for automatically delivering and installing the application program without remote user interaction, the means for automatically delivering and installing includes:

means for transferring a decompression program to the remote user;

means for decompressing the application program;

means for verifying the successful decompression of the application program; and means for updating system logs of the data processing system.

12. A system as recited in claim 11 wherein the means for (c) includes causing the delivery to occur immediately.

13. A system as recited in claim 11 wherein the means for (c) includes:

means for reading a record in the sequential file;

means for checking if the application is to be skipped;

means for comparing the date and time to install in the record of the sequential file with the current date and time; and means for suspending the delivering for a predetermined time period if no application program is to be delivered based on the delivery information.

14. A system for installing at least one of a plurality of application programs within a data processing system, to a remote user comprising:

a) means for packaging the application program into an application packages;

b) means for creating delivery information in a sequential file;

c) means for determining when an install is to occur based on the delivery information;

d) means for logging onto the remote user; and e) means for automatically delivering and installing each application program without remote user interaction, the means for automatically delivering and installing includes:

means for transferring a decompression program to the remote user;

means for decompressing the application program;

means for verifying the successful decompression of the application program; and means for updating system logs of the data processing system.

15. A system for installing a plurality of application programs within a data processing system, to at least one of a plurality of remote users, comprising:

a) means for packaging the application programs into application packages;

b) means for creating delivery information in a sequential file, based on time and date of desired delivery to each remote user;

c) means for determining when an install is to occur based on delivery information;

d) means for logging onto each remote user; and e) means for automatically delivering and installing each application program to each remote user at the specified date and time without remote user interaction, the means for automatically delivering and installing includes:

means for transferring a decompression program to the remote user;

means for decompressing the application program;

means for verifying the successful decompression of the application program; and means for updating system logs of the data processing system; and f) means for verifying, at each remote user, the installation of the proper number of files within the application program were successfully installed.

16. A system for installing at least one of a plurality of application programs within a data processing system, to at least one of a plurality of remote users, comprising:

a) means for packaging the application programs into application packages;

b) means for creating delivery information in a sequential file, based on time and date of desired delivery to each remote user;

c) means for determining when an install is to occur based on the delivery information;

d) means for logging onto each remote user;

e) means for automatically delivering and installing each application program to each remote user at the specified date and time without remote user interaction, the means for automatically delivering and installing includes:

means for transferring a decompression program to the remote user;

means for decompressing the application program;

means for verifying the successful decompression of the application program; and means for updating system logs of the data processing system; and f) means for verifying, at each remote user, the installation of the proper number of files within the application program were successfully installed.

17. A computer-readable medium encoded with a computer program which causes a computer to install an application program within a data processing system, to a remote user, the computer program causing the computer to perform the steps of:

a) packaging the application program into an application package;

b) creating delivery information in a sequential file;

c) determining when an install is to occur based on the delivery information;

d) logging onto the remote user; and e) automatically delivering and installing the respective application program without remote user interaction, the step of automatically delivering and installing includes the steps of:

transferring a decompression program to the remote user;

decompressing the application program;

verifying the successful decompression of the application program; and updating system logs of the data processing system.

* * * * *